US006503476B1

(12) United States Patent
Suib et al.

(10) Patent No.: US 6,503,476 B1
(45) Date of Patent: Jan. 7, 2003

(54) MANGANESE OXIDE HELICES, RINGS, STRANDS, AND FILMS, AND METHODS FOR THEIR PREPARATION

(75) Inventors: Steven L. Suib, Storrs, CT (US); Oscar Giraldo, Storrs, CT (US); Manuel Marquez, Wheeling, IL (US); Stephanie Brock, Detroit, MI (US)

(73) Assignee: The University of Connecticut, Storrs, CT (US)

( * ) Notice: Subject to any disclaimer, the term of this patent is extended or adjusted under 35 U.S.C. 154(b) by 4 days.

(21) Appl. No.: 09/624,423

(22) Filed: Jul. 24, 2000

Related U.S. Application Data

(60) Provisional application No. 60/145,340, filed on Jul. 23, 1999.

(51) Int. Cl.[7] .............................................. C01G 45/00
(52) U.S. Cl. ....................................... 423/599; 423/605
(58) Field of Search .................................. 423/605, 599

(56) References Cited

U.S. PATENT DOCUMENTS

| | | | |
|---|---|---|---|
| 3,627,694 A | * | 12/1971 | Mackey |
| 4,207,291 A | * | 6/1980 | Byrd et al. |
| 5,578,282 A | * | 11/1996 | O'young et al. |
| 5,635,155 A | * | 6/1997 | O'young et al. |
| 5,702,674 A | * | 12/1997 | O'young et al. |

OTHER PUBLICATIONS

Brock, et al., "Particle size control and self–assembly processes . . . manganese oxide", J. Phys. Chem. B 1999, 103, pp. 7416–7428, Aug., 1999.*
Barsoum, M. W., et al, "Room–Temperature Deintercalation and Self–Extrusion of Ga from Cr2 GaN", Science, 1999, vol. 284, pp. 937–939, May.
Chung, S. W., et al, "Fabrication and Alignment of Wires in Two Dimensions", J. Phys. Chem., 1998, vol. 102, pp. 6685–6687, Aug.
Deegan, R. D., et al, Capillary Flow as the Cause of Ring Stains from Dried Liquid Drops, Nature, 1997, vol. 389, 827–829, Oct.
De Guzman, R. N, et al, "Role of Cyclic Voltammetry in Characterizing Solids: Natural and Synthetic Manganese Oxide Octahedral Molecular Sieves", Chem. Mater., 1993, vol. 5, pp. 1395–1400, Oct.
Engelkamp, H., et al, "Self–Assembly of Disk–Shaped Molecules to Coiled–Coil Aggregates with Tunable Helicity", Science, 1999, vol. 284, pp. 785–788, Apr.
Gier, T. E., et al, "Synthesis and Organization of Zeolite––Like Materials With Three–Dimensional Helical Pores", Nature, 1998, vol. 395, 154–57, Sep.

Motojima, S., et al, "Growth of Regularly Coiled Spring––Like Fibers of Si3N4 by Iron Impurity–Activated Chemical Vapor Deposition", Appl. Phys. Lett., 1989, vol. 54, pp. 1001–1003, No month.
Muller, S. C., et al, "Curiosities in Periodic Precipitation Patters", Science, 1982, vol. 216, pp. 635–637, May.
Ohara, Pamela C., et al, "Self–Assembly of Submicrometer Rings of Particles from Solutions of Nanoparticles", Angew. Chem. Int. Ed., 1997, vol. 36, pp. 1078–1080, Jun.
Polezhaer, A. A., et al, "Complexity of Precipitation Patterns: Comparison of Simulation with Experiment", Chaos, 1994, vol. 4, pp. 631–636, No month.
Raimondi, Maria E., et al , "Synthesis of Direct Templated Aligned Mesoporous Silica Coatings Within Capillaries", Chem. Commun., 1997, 1843–1844, No month.
Rowan, Alan E., et al, "Helical Molecular Programming", Angew. Chem. Int. Ed., 1998, vol. 37, pp. 63–68, No month.
Soghomonian, V., et al, "An Inorganic Double Helix: Hydrothermal Synthesis Structure, and Magnetism of Chiral [(CH3)2NH2K4V10O10(H2O)2(OH)4(PO4)7] 4H20", Science, 1993, vol. 259, pp. 1596–1599, Mar.
Spahr, M. E., et al, "Redox–Active Nanotubes of Vanadium Oxide", Angew. Chem. Int. Ed., 1998, vol. 37, pp. 1263–1265, May.
Strobel, P., et al, "Thermal and Physical Properties of Hollandite–Type K1.3MN8O16 and 9K,H3O)XMN8O16", Sol. State. Chem., 1984, vol. 55, pp. 67–73, Nov.
Tian, Z. R., et al, "Manganese Oxide Mesoporous Structures: Mixed–Valent Semiconducting Catalysts", Science, 1997, vol. 276, pp. 926–930, May.
Yamamoto, S., et al, "Micro–Rings of Manganese Dioxide Nanocrystals on MICA", Chem. Lett., 1998, pp. 809–810, Aug.
Yang, P., et al, "Generalized Syntheses of Large–Pore Mesoporous Metal Oxides with Semicrystalline Frameworks", Nature, 1998, vol. 396, pp. 152–155, Nov.

* cited by examiner

*Primary Examiner*—Steven Bos
(74) *Attorney, Agent, or Firm*—Cantor Colburn LLP (57) ABSTRACT

Methods for the preparation of mixed-valence manganese oxide compositions with quaternary ammonium ions are described. The compositions self-assemble into helices, rings, and strands without any imposed concentration gradient. These helices, rings, and strands, as well as films having the same composition, undergo rapid ion exchange to replace the quaternary ammonium ions with various metal ions. And the metal-ion-containing manganese oxide compositions so formed can be heat treated to form semiconducting materials with high surface areas.

30 Claims, 6 Drawing Sheets

FIG 6

MANGANESE OXIDE HELICES, RINGS, STRANDS, AND FILMS, AND METHODS FOR THEIR PREPARATION

CROSS REFERENCE TO RELATED APPLICATIONS

The present application is a U.S. non-provisional application based upon and claiming priority from U.S. provisional application Ser. No. 60/145,340 filed Jul. 23, 1999.

The U.S. Government has rights in this invention pursuant to Contract No. 522035 awarded by the U.S. Department of Energy.

STATEMENT REGARDING FEDERALLY SPONSORED RESEARCH & DEVELOPMENT

This invention was made with Government support under Grant Number DEFG02–86ER13622 awarded by the United States Department of Energy. The Government has certain rights in the invention.

BACKGROUND OF THE INVENTION

This invention relates to manganese oxide compositions. In particular, this invention relates to mixed-valence manganese oxide compositions capable of self-assembly into helices, rings, strands, and films.

The pursuit of new conducting thin films and wires has long been a goal of molecular engineering. Various materials of different morphologies have been pursued to fill the needs for various end-uses such as sensors, new conducting materials to enhance computing speed and storage density, and as effective membrane materials for separations.

Helical structures have been shown to occur at the nanomolecular, macromolecular, and molecular levels and are widely found throughout nature (see Rowan, A. E.; Nolte, R. J. M. *Angew. Chem. Int. Ed.,* 1998, 37, 63–68). However, purely inorganic helices have only recently been reported (see Soghomonian, V.; Chen, Q.; Haushalter, R. C.; Zubieta, J.; O'Connor, C. J.; Lee, Y. S., *Science,* 1993, 259, 1596–1599). Transition metal arsenate and germanate zeolite-like UCSB-7 systems have been shown to have helical 3-D pores (see Gier, T. E.; Bu, X.; Feng, P.; Stucky, G. D., *Nature,* 1998, 395, 154–57). Chemical vapor deposition methods have been used to coat carbon and form inorganic ceramic spiral materials such as $Si_3N_4$ (see Motojima, S.; Ueno, S.; Hattori, T.; Goto, K. *Appl. Phys. Lett.,* 1989, 54, 1001–1003). Coil diameters of 10–15 microns have been observed. The formation of helices of MCM-41 type materials has been suggested for silicate systems and a true liquid crystal templating effect has been proposed (see Raimondi, M. E.; Maschmeyer, T.; Templer, R. H.; Seddon, J. M. *J. Chem. Soc. Chem. Comm.,* 1997, 1843–1844). Redox active nanotubes of mixed valent vanadium oxide having diameters on the order of 0.5 to 4 nm have recently been reported (see Spahr, M. E.; Bitterli, P.; Nesper, R.; Muller, M.; Krumeich, F.; Nissen, H. U. *Angew. Chem. Int. Ed.,* 1998, 37, 1263–1265). Large pore semicrystalline mesoporous transition metal oxides of manganese and other transition metals have been reported (see Tian, Z. R.; Tong, W.; Wang, J. Y.; Duan, N.; Krishnan, V. V.; Suib, S. L. *Science,* 1997, 276, 926–930; and Yang, P.; Zhao, D.; Margolese, D. I.; Chmika, B. F.; Stucky, G. D. *Nature,* 1998, 396, 152–155). Recently, disk-shaped crown ether phthalocyanine and polysiloxane coiled-coil aggregates, of 50 nm diameter and a few microns in length, have been grown in organic gels (see Engelkamp, H.; Middelbeek, Nolte, R. J. M. *Science,* 1999, 284, 785–788). Filaments of single crystalline Ga a few cm in length and on the order of 2–100 microns diameter have recently been reported to grow via de-intercalation of $Cr_2GaN$ (see Barsoum, M. W.; Farber, L. *Science,* 1999, 284, 937–939).

Metallic self-assembled rings of 0.9 micron diameter for potential use in electron transfer and in optical devices where the annulus widths and surface ring coverages can be controlled, have more recently been reported (see Ohara, P. C.; Heath, J. R.; Gelbart, W. M. *Angew. Chem. Int. Ed.,* 1997, 36, 1078–1080). Ring stains and deposits have been observed, and mechanisms for their formation have recently been related to capillary flow effects (see Deegan, R. D.; Bakajin, O.; Dupont, T. F.; Huber, G.; Nagel, S. R.; Witten, T. A., *Nature,* 1997, 389, 827–829). Control of 20 to 300 nmn widths of silver nanocrystalline wires on carbon coated copper grids was achieved via Langmuir-Schaeffer horizontal liftoff methods (see Chaung, S. W.; Markovich, G.; Heath, J. R. *J. Phys. Chem.,* 1998, 102, 6685–6687). Rings of manganese oxide nanocrystals of 40 nm diameters have been photodeposited on mica (see Yamamoto, S.; Matsuoka, O.; Sugiyama, *S. Chem. Lett.,* 1998, 809–810). Wires of manganese and manganese oxide are not known due to inherent problems with brittleness.

Helices have been reported to form as irreproducible curiosities under strongly imposed concentration gradients, and stochastic processes dominate in gradient-free precipitating systems. (see Muller, S. C.; Kai, S.; Ross, *J. Science,* 1982, 216, 635–637). Structure formation in precipitating colloidal systems has been observed since more than a century ago, for example, in systems where a salt is allowed to diffuse in a gel containing another salt. Rings, Saturn-rings and even helices have been observed in such gradient and so-called Liesegan g systems (see Liesegang, R. E.; *Naturwiss Wochenschr.* 1896, II, 353; Lloyd, F. E.; Moravek, V. *J. Phys. Chem.,* 1931, 35, 1512–1564; Muller, S. C.; Kai, S.; Ross, *J. Science,* 1982, 216, 635–637; Polezhaer, A. A.; Muller, S. C. *Chaos,* 1994, 4, 631–636). However, no isolation of these structures, and furthermore, no functionality has ever been reported. Reproducible formation of helices in gradient-free rather than Liesegang (gradient) systems by self-organization along the hole volume of the system has not been reported.

SUMMARY OF THE INVENTION

Self-assembled helices, rings, and strands, as well as films, are formed by a method comprising:

preparing a solution comprising (a) a mixed-valence manganese oxide anion having an average manganese oxidation state of about 3 to about 4, (b) a quaternary arnmonium cation, and (c) a solvent;

contacting the solution with a surface comprising hydroxyl groups; and evaporating the solvent to form a mixed-valence manganese oxide material.

The invention also relates to compositions formed by the method, as well as to the helixes, rings, strands, and films formed by the method.

BRIEF DESCRIPTION OF THE DRAWINGS

FIGS. 5($d$) and ($e$) are high-resolution TEM views of the crystallites: FIG. 5($d$) is a view perpendicular to the long axis of the crystallite (c-axis) and FIG. 5($e$) is a view down the c-axis. The inset of FIG. 5($e$) is an FFT processed image showing structure consistent with the 2×2 channel structure of K-OMS-2.

DETAILED DESCRIPTION OF THE INVENTION

The present invention provides a method for the preparation of stable helices, rings, strands, and films comprising mixed-valence manganese oxide materials. In one embodiment, the materials are amorphous gels of mixed-valence manganese oxide. While conventional wires of manganese and manganese oxide are impractical due to inherent problems with brittleness, the helical filaments of the present invention are flexible enough to be wrapped around other objects without breakage or collapse. Additionally, the materials reported here contain micropores and are also excellent semiconductors.

In one embodiment, a method for the formation of manganese oxide materials comprises:

preparing a solution comprising (a) a mixed-valence manganese oxide anion having an average manganese oxidation state of about 3 to about 4, (b) a quaternary amimonium cation, and (c) a solvent;

contacting the solution with a surface comprising hydroxyl groups; and evaporating the solvent to form a mixed-valence manganese oxide material.

The method includes preparing a solution comprising (a) a mixed-valence manganese oxide anion having an average manganese oxidation state of about 3 to about 4, (b) a quaternary ammonium cation, and (c) a solvent, The solution may be prepared in a variety of ways. A high valence manganese species (e.g., a manganese species with oxidation state +5, +6, or +7) may be reduced chemically or electrochemically to yield the manganese oxide with average oxidation state of about 3 to about 4. Alternatively, a low valence manganese species (e.g., a manganese species with oxidation state +2) may be chemically or electrochemically oxidized to yield the manganese oxide with average oxidation state of about 3 to about 4. Another alternative, which is essentially a hybrid of the first two, is to cross oxidize a low valence manganese species with a high valence manganese species to yield the manganese oxide with average oxidation state of about 3 to about 4.

In a preferred embodiment, a high-valence manganese oxide species such as a quaternary ammonium permanganate may be reacted with an aliphatic alcohol, such as 2-butanol, to form the colloidal solution comprising amorphous particles or crystallites of manganese oxide species having particle sizes in the range of about 40 to about 60 Angstroms, as characterized by small angle neutron scattering. While not wishing to be bound by any particular hypothesis, the inventors believe that one function of the aliphatic alcohol is as a reducing agent to reduce the average manganese oxidation state from +7 to a value of about +3 to about +4.

The quaternary ammonium cation comprised by the solution may be a tetrasubstituted ammonium cation (NR$_4$)+, where each R is independently selected from C$_1$–C$_6$ alkyl. Tetramethylammonium and tetraethylammonium are preferred, with tetramethylammonium being more preferred.

The solvent comprised by the solution may be water, or a miscible mixture of water and at least one aliphatic alcohol. Preferred aliphatic alcohols are represented by the formula ROH, where the R is selected from C$_1$–C$_6$ alkyl. Preferred alcohols include methanol, ethanol, n-propanol, isopropanol, n-butanol, 2-butanol, n-pentanol, 2-pentanol, and 3-pentanol. A highly preferred aliphatic alcohol is 2-butanol.

In a preferred embodiment, the solution comprises the product of the reaction of [N(CH$_3$)$_4$]MnO$_4$ and 2-butanol, where the reaction takes place in two-phase medium of distilled, deionized water and 2-butanol, and the product of the reaction is obtained by separating the lower (primarily aqueous) layer. The concentration of Mn in the resulting colloidal solution of manganese oxide may be about 0.001 M in Mn to about 0.1 M.

The method comprises contacting the colloidal solution with a surface comprising hydroxyl groups. A preferred surface is a hydroxyl-bearing surface in the form of a container. Surfaces, such as glass, quartz, copper and aluminum are preferred. A highly preferred surface is silicate glass. Use of surfaces without free-hydroxyl groups, such as Teflon or glass treated to remove free hydroxyl groups, may lead to distorted helical or non-helical structures. While not wishing to be bound by any particular mechanism, the inventors speculate that hydroxyl groups are important in the formation of the rings and helices. The angle of the surface from a strictly vertical position is not critical, although a horizontal orientation does not lead to well formed helices. The helices can form in a wide variety of container sizes. The preferred containers have diameters from about 0.1 mm to about 5 cm while the most preferred diameters are about 1.2 mm to about 1 cm.

The method comprises evaporating the solvent to form a mixed-valence manganese oxide material. It is during solvent evaporation that formation of helices, rings, strands, and films occurs. It appears that heating expedites the nucleation of the self-assembly process to a degree, but evaporating the solvent too quickly may lead to crystalline precipitation rather than the formation of desired amorphous helices, rings, strands, or films. The temperature during the growth of the forms may be about 10° C. to about 200° C., preferably about 20° C. to about 100° C., and more preferably from about 25° C. to about 90° C. For the growth of some helical structures, a highly preferred temperature is about 80° C. to about 90° C.

The initial concentration of the manganese oxide sols and the shape of the contacted surface reproducibly control the formation of helices, rings, films, or strands. Sols are defined as having less than 50 percent solid in a solution, and gels are defined as having more than 50 percent solid in a solution. The term "helices" refers to coiled filaments formed in contact with the inside surface of a cylinder. The coiled filaments forming helices may themselves be spiral in cross-section. In other words, a spiral is defined by a cross-section of the filament through a plane perpendicular to the instantaneous longitudinal axis of the filament (see FIG. 5(a)). Rings are also formed in contact with the inside surface of a cylinder, and conditions for the formation are discussed below. "Strands" refers to the approximately linear structures formed under certain conditions when the manganese oxide sols are contacted with a planar surface; strands may be approximately semi-circular in cross-section. "Films" refers to approximately uniform layers of material which are formed under certain conditions when the manganese oxide sols are contacted with planar surfaces.

When the manganese oxide sol or colloidal solution is contacted with a cylindrical surface, formation of self-assembled helices is favored by relatively high manganese oxide concentrations (i.e., about $10^{-2}$ to about $10^{-1}$ mole/liter as elemental manganese), while formation of rings is favored by lower manganese oxide concentrations (i.e., about $10^{-3}$ to about $10^{-2}$ mole/liter as elemental manganese). These living helices grow as a single strand in contact with the cylindrical surface, rather than as multiple helices within one container. When the manganese oxide sol is contacted with a planar surface, formation of films is favored by relatively high concentrations, while self-assembly of parallel strands is favored by relatively low concentrations. Films and strands may be formed in a dip coating process by immersing flat surfaces into the sol then removing them and allowing solvent to evaporate. This dip coating process can lead to lines of diameters from about 1 micron to about 1 millimeter. A cross-hatch pattern can be produced by dip-coating and drying surface to produce a first set of parallel strands, then turning the surface 90 degrees and repeating the process to form a second set of parallel strands perpendicular to the first set.

Lengths of the helices range from the nanometer to the centimeter scale. While helixes as long as 25 cm have been produced, this length is only limited by the length of the cylindrical container. There appears to be no inherent limit to helix lengths, and continuous processes for producing helices of essentially unlimited length are expressly contemplated. The number of turns of the resulting helices is primarily related to the starting concentration of the sol and diameter of the container. The diameters of the helices can range from about 30 microns to about 1 centimeter. The sizes and number of windings of the helices are highly reproducible, being controlled by the concentration of manganese oxide in the colloidal sol and the internal diameter of the cylindrical surface contacting the solution. The sols can be evaporated under vacuum to afford less uniform helices. When obstructions are placed in the normal path of the helix, the direction of the winding of the helix can be altered to avoid the obstruction.

The microstructure of the manganese oxide compositions appears to contribute to the rapid rates of ion-exchange exhibited by these materials. For example, the self-assembled helices may exhibit porosity on three levels: primary microporosity within the manganese oxide crystallites, secondary ("mesoscopic") porosity defined by channels extending parallel to helix axis along the assembly of elongated crystallites, and tertiary porosity defined by the spaces in the spiral cross-section of the helical filament. Note that the secondary and tertiary porosities represent channels that are parallel to each other. As a result of this alignment, conduction along the helix is favored and rates of ion exchange are enhanced. This hierarchical structure is formed in the absence of any external forcing and in the absence of any initially imposed concentration gradients.

The present invention demonstrates the reproducible formation of helical filaments in gradient-free rather than Liesegang (gradient) systems by self-organization along the hole volume of the system. The self-assembled helices may exhibit order on multiple scales (from the nm to the cm scale), which is remarkable considering that they are formed starting from a well-mixed colloidal precursor and applying no external forcing other than confinement in a container, such as a capillary, and allowing the solvent to be evaporated. Exactly how the particulates present in the colloidal solution organize into the helical structures is not well understood, however, a self assembly process in a gradient free system resulting in evenly spaced turns of the helices or of the rings is clearly in effect. The affinity of the colloidal particles to nucleate at the container wall appears to contribute to the observed outcome of helical formation.

Figure 1:
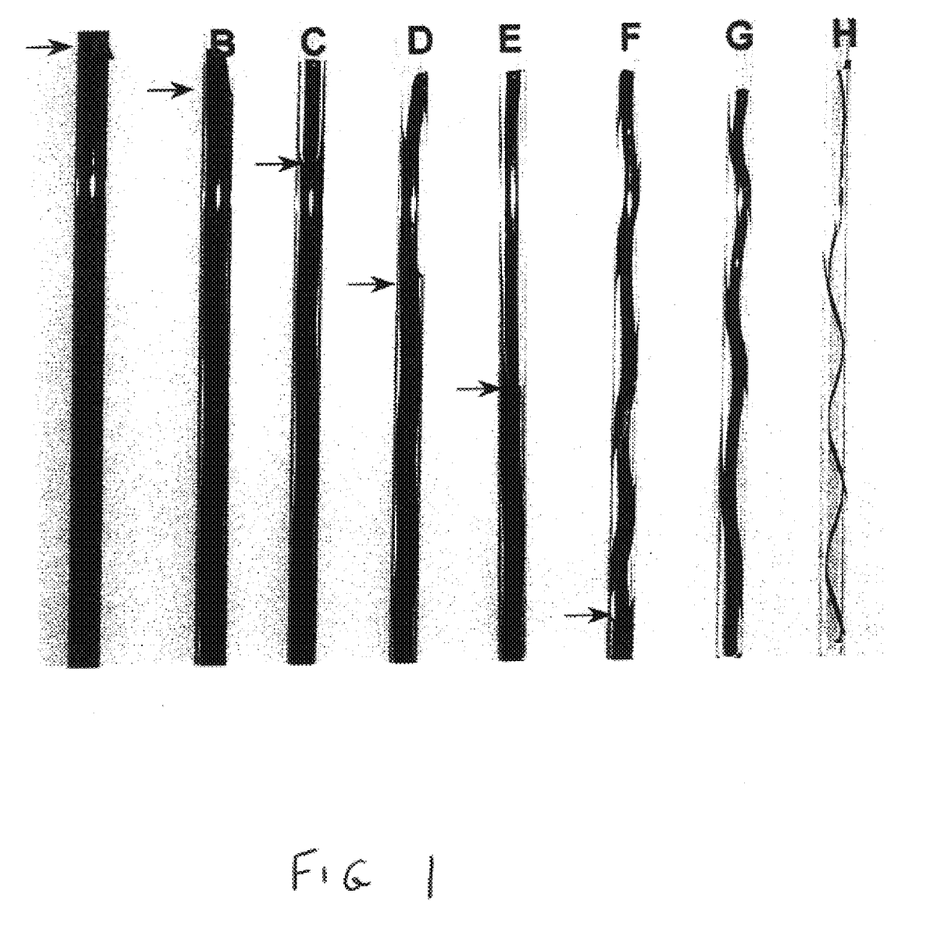
FIG. 1 displays heating effects of 0.1 M tetramethylammonium (TMA) colloidal solutions; tubes of 3 mm id were heated @ 85° C. for (a) 0 h, (b) 12 h, (c) 17 h, (d) 24 h, (e) 36 h, (f) 67 h, (g) 90 h, and (h) 180 h; arrows indicate the level of the solvent during thermal treatment.

Microscopy studies suggest that there is an anchoring of the manganese oxide sols and gels to glass capillary walls during growth. Preferred orientation deduced from X-ray diffraction studies (XRD) along with electron microscopy data suggest that hydroxyl groups of the capillary walls interact with hydroxyl groups of the sol to form layered phases parallel to the walls and tunnels in octahedral molecular sieve or OMS-2 helices that run along the helix. Time-lapse hotographs indicate contraction followed by expansion along the length of the capillary (FIG. 1). The helix form is clearly observed during the expansion.

The initially formed compositions may be further treated to yield a variety of conducting materials. The porosity of the initially formed materials is evidenced by the ability to introduce cations and neutral organic species into their structures in a matter of seconds. For example, complete ion-exchange occurs with replacement of all tetramethylammonium ions (TMA$^+$) with potassium ions (K+) in 10 min at room temperature under ultrasonic cavitation (UC). There is not particular limitation on the cations that may be ion-exchanged for quaternary ammonium ions in the initially formed compositions. For example, cations that may be introduced include metal ions of Group I, II, III, IV, V, VI, VII, and VIII of the periodic table. Ions presently preferred for ion-exchange into the composition include Li$^+$, Na$^+$, K$^+$, Rb$^+$, Cu$^{2+}$, Ni$^{2+}$, Cr$^{2+}$, Zn$^{2+}$, La$^{3+}$, and the like.

The manganese oxide compositions can also be doped with neutral and ionic species by rapid incorporation. Doping can occur by adding about 1 part per million (ppm) to about 2% of a dopants to the sol prior to evaporation of the solvent. The dopants incorporate of into the lattice sites of the composition. Dopants are chosen from the group consisting of neutral species such as CO, NH$_3$, Si, or metal cations of Groups I, II, III, IV, V, VI, VII, and VIII of the periodic table. Presently preferred dopants include Zn$^{2+}$, Cu$^{2+}$, Ni$^{2+}$, Co$^{2+}$, Ca$^{2+}$, Sr$^{2+}$, Ba$^{2+}$, Mg, Cr$^{3+}$, Al$^{3+}$, and the like. Various doping and/or ion exchange species lead to crystalline materials with increased conductivity that may be useful as wires and in other charge-carrying applications.

The versatile helix, ring, strand, and film materials hold promise for the synthesis of new materials of wide ranging composition due to their porosity and ready ion-exchange properties. Ability to modify the composition after synthesis by rapid incorporation of neutral or ionic species, such as silicon and K$^+$, allows for the ability to make conducting helical filaments and optically transparent helical filaments. The materials can be thermally modified to produce flexible octahedral layered structure (OL) and octahedral molecular sieve (OMS) phases, and to provide micro and macro templates for a variety of potential applications.

Potential applications of these materials include batteries, electronics, magnetic devices, optical systems, catalysts, sensors, chromatography, imaging, semiconductors, lighting devices, fuel cells, switches, electrical conductivity devices, magnetic recording devices, coatings, adhesion protection, ceramics, controlled release substrates, medical devices, and other areas.

One preferred embodiment is a method for the formation of self-assembled helices. Tetramethylammonium permnanganate is dissolved in distilled deionized water to form a solution having a manganese concentration of about $10^{-2}$ to about $10^{-1}$ moles/liter. The aqueous solution is stirred with 2-butanol, which is present as a second, less dense, phase, to form a colloidal solution of manganese oxide in the aqueous phase. The colloidal solution is separated from the 2-butanol phase and transferred to a cylindrical glass tube sealed at one end and having an internal diameter of about 1 to about 10 millimeters. Solvent is evaporated from the colloidal solution at about 85° C., typically for several hours, until a helical gel forms and no free solvent is visible in the tube. The helix is removed from the tube either by cutting the tube or by adding a solvent. Elemental analysis of the gel is consistent with an empirical formula of $[N(CH_3)_4]^+_{0.93}Mn^{4+}_{2.1}Mn^{3+}_{1.9}O_7(OH)_{1.3} \cdot 5H_2O$ and a synthetic birnessite composition in which the sodium ions of native birnessite have been replaced with tetramethylammonium ions.

In another preferred embodiment, a helix prepared, for example, as described above, is contacted with a potassium ion solution (e.g., 1 M potassium nitrate) to effect an ion exchange with tetramethylammonium ion, then dried at 85° C. for about eight hours to yield a composition consistent with the empirical formula $K^+_{0.93}Mn^{4+}_{2.1}Mn^{3+}_{1.9}O_7(OH)_{1.03} \cdot 2.7H_2O$ birnessite composition in which the sodium ions of native birnessite have been replaced with potassium ions (K-OL-1). In contrast to the corresponding tetramethylammonium material, which is amorphous, this potassium composition is crystalline, as indicated by x-ray diffraction.

In another embodiment, a helix having undergone ion exchange with potassium, as described above, is heated at a temperature of about 400° C. to about 600° C. for about 4 to about 8 hours to effect solid state transformation from the potassium birnessite structure (K-OL-1) to the microporous tunnel structure of potassium cryptomelane (K-OMS-2). Potassium cryptomelane has tunnel dimensions of 4.6 by 4.6 angstroms (see DeGuzman, R. N.; Shen, Y. F.; Suib, S. L.; Shaw, B. R.; O'Young, C. L., Chem. Mater., 1993, 5, 1395–1400).

The invention is further illustrated by the following non-limiting examples.

Materials and Methods

Tetramethylammonium permanganate ($[TMA^+]$ $[KMnO_4^-]$)was synthesized from tetramethylammoniun chloride and potassium permanganate. 2-Butanol was obtained from Aldrich Chemical Company.

Scanning electron micrographs (SEM) were obtained using a JEOL 100 CX microscope operated at an accelerating voltage of 20 kV. The samples were coated with gold using a Diatome diamond knife.

Transmission electron micrographs (TEM) were obtained by imaging the thin sections on carbon mesh copper grids using a JEOL 3010 microscope operated at an accelerating voltage of 300 kV and magnification of 300,000 times.

DC conductivities were measured using a four-probe technique in which two leads were attached to the end of a helix, and two leads were attached to its sides. Conductivities were measured by placing a known voltage across the end leads and measuring the current between them.

Fourier Transform Infrared (FTIR) spectra were taken on a 750 Magna NICOLET instrument.

Microanalytical studies (elemental analyses) were performed using inductively coupled plasma and combustion analyses.

X-ray diffraction (XRD) studies were carried out on P2000 SCINTAG instrument.

Differential scanning calorimetry (DSC) and thermogravimetric analysis (TGA) were conducted on a DuPont Thermoanalyzer.

EXAMPLE 1

A colloidal solution of lamellar manganese oxide (0.1M in Mn) was prepared by adding 10 mmol $[TMA^+][KMnO_4^-]$ to a stirred mixture of 100 mL of distilled deionized water (DDW) and 30 mL of 2-butanol at room temperature. After 30 min a dark red-brown solution was formed in the lower (aqueous) layer. This aqueous solution was separated from the upper organic layer with a separatory funnel and then either used as is (ca. 0.1 M Mn) or diluted (to as little as 0.001 M Mn). The amorphous sol starting material has been characterized by small angle neutron scattering to have homogeneous particle sizes on the order of 40 to 60 Angstroms.

EXAMPLE 2

This example describes the formation of a self-assembled helix from a tetram ethyl ammonium permanganate sol (a colloidal solution). A colloidal solution prepared as in Example 1 and having a Mn concentration of 0.1 M was placed in 3 mm internal diameter capillaries and heated to 85° C. for 160 h. The helical gel formed had a composition of $[TMA^+]_{0.93}Mn^{4+}_{2.1}Mn^{3+}_{1.9}O_7(OH)_{1.03} \cdot 5H_2O$, corresponding to a manganese average oxidation state (AOS) of 3.52.

$TMA_yMnO_x$ Helix, theoretical (experimental via inductively coupled plasma and combustion analyses) %C 8.82 (10.58), %H 4.36 (4.47), %N 2.57 (2.86). Trace levels of silicon were detected at the surface of the helix.

EXAMPLE 3

This example describes ion exchange to replace the tetramethylammonium ion in a helix with potassium ion. Ion exchange was effected by immersing a helix, prepared as in Example 2, in a 1 M $KNO_3$ solution for 10 min under ultrasonic cavitation (UC), washing 10 times with DDW under UC, and drying at 85° C. for 8 h.

Figure 4:
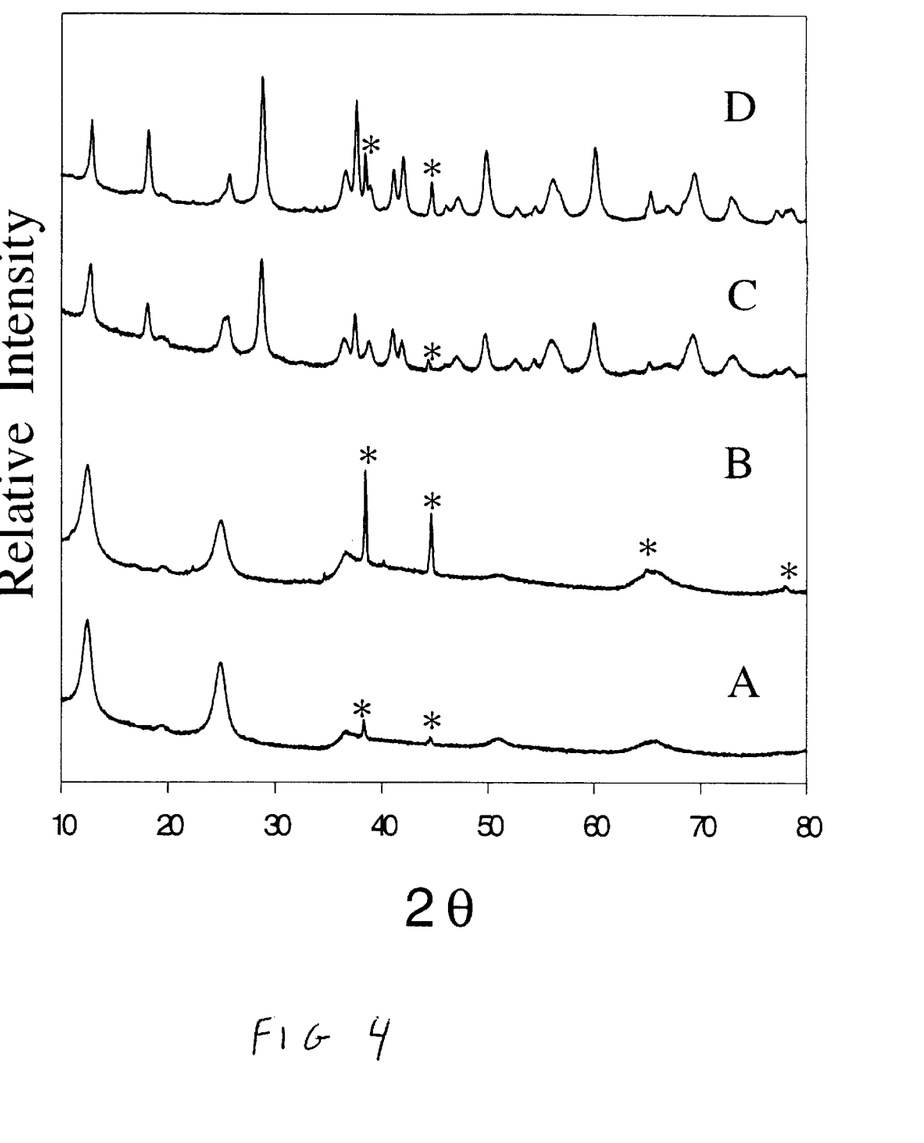
FIG. 4 is X-ray powder diffraction data of (A) K-OL-1 helix, (B) K-OL-1 ground helix, (C) K-OMS-2 helix, (D) K-OMS-2 ground helix, (*Reflections from Al sample holder).

Ion exchange of the $TMA^+$ manganese oxide helix with $K^+$ led to crystalline helices (FIG. 4) having the composition $K^+_{0.93}Mn^{4+}_{2.1}Mn^{3+}_{1.9}O_7(OH)_{1.03} \cdot 2.7H_2O$ and octahedral layered (OL) structure of synthetic bimessite (K-OL-1). X-ray diffraction in a transmission geometry indicated the orientation of the bimessite layers relative to the helix axis. Specifically, the intensity distribution of the hko reflections indicated a preferential distribution of these planes with their normal being perpendicular to the helical axis. This observation is consistent with the c-axis being preferentially along the long axis of the fiber fragment. Fourier Transform Infrared (FTIR) and micro analytical studies also show the complete loss of $TMA^+$ cations from the helices after ion exchange with $K^+$.

When the helices were crushed into small particles, the OL-1 pattern was still observed, although the preferential orientation of (001) reflections was then minimized. No other phases were observed by XRD. Optical and electron microscopy photomicrographs showed that the external surfaces of the helices were well formed and uniform.

K-OL-1 Helix theoretical (experimental via inductively coupled plasma and combustion analyses) %C 0 (0.34), %H 1.47 (1.23), %N 0 (0.03), K/Mn 0.2325 (0.2325). Trace levels of silicon were detected at the surface.

The XRD data clearly showed that microporous phases were present in these helices. The intact helices showed a surface area of 2.6 $m^2/g$ for the K-OL-1 phase.

Lattice parameters for K-OL-1 helix [literature (Drits, V. A. et al. Am. Miner., 1997, 82, 946–961); experimental] a=[2.848 Å; 2.85 Å]; c=[7.19 Å; 7.17 Å]; γ=[120; 120]. Note that the (004) observed for K-OL-1 helices is often not observed in powder and less ordered materials. Reflections for OL systems (I=0) are proportionately stronger in helices relative to ground powders indicating preferential orientation.

The K-OL-1 precursor helix exhibited a conductivity of $3.7 \times 10^{-4}$ $Ohm^{-1}$ $cm^{-1}$ at 25° C.

EXAMPLE 4

This example describes the thermal treatment of the K-OL-1 helices to form K-OMS-2 helices. Thermal treatment of the helices of K-OL-1 at 500° C. for about 4 hours led to formation of an octahedral molecular sieve (OMS) tunnel structure of synthetic cryptomelane (K-OMS-2). An exothermic phase transition of the helical K-OL-1 material was observed via differential scanning calorimetry at 496° C. This phase had a composition of $K^+_{1.86}Mn^{4+}_{4.7}Mn^{3+}_{3.3}O_{14.57}(OH)_{1.43} \cdot 0.7H_2O$ corresponding a manganese average oxidation state of 3.58. DSC and TGA studies of the helical K-OMS-2 materials showed stability above 800° C.

Figure 5:
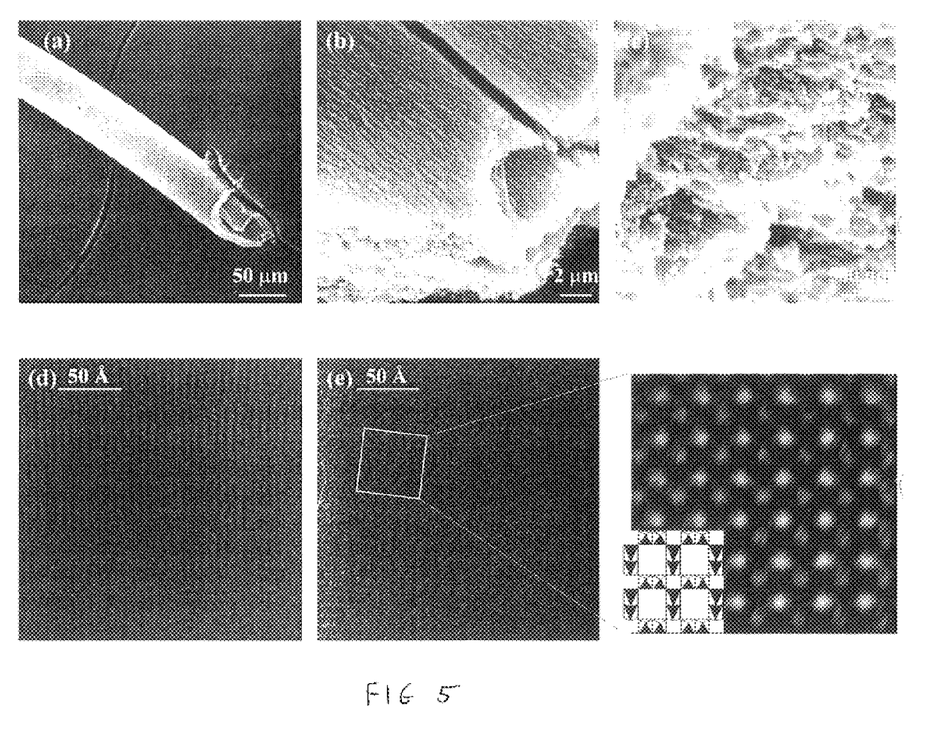
FIG. 5 is a scanning electron microscopy images of K-OMS-2 fiber fragment (a, b, c) at increasing magnifications from a to c.

The morphology and microstructure of the K-OMS-2 helix were examined by scanning and transmission electron microscopy (TEM). FIG. 5 shows collective results from the microscopic examination of the OMS-2 helices. A small linear fragment of the helix was cut and examined first by SEM. Striations were evident along the length indicating a fibrous structure further corroborated by the direction of crack propagation from sample preparation (the crack ran along the long axis of the helix fragrnent, FIG. 5B). Moreover, secondary spiraling along the radial direction of the helix was revealed by the SEM images (FIG. 5A).

High-resolution SEM images (FIG. 5C) indicated that the fragment of the helix consisted of close-packed elongated crystallites with 0.1 micron length and 0.01-0.03 mm width. High-resolution TEM images (FIGS. 5D and 5E) showed that the needle-like crystallites had a microporous structure consistent with that of OMS-2 with the 2×2 channels running along the small crystal dimension. Moreover, TEM images indicated the presence of dislocations in views perpendicular to the c-axis. ED was consistent with the OMS-2 structure.

Lattice parameters for K-OMS-2 helix space group I 4/m [single crystal, helix] a=[9.866(3); 9.848(9)], c=2.872(1); 2.859(2)]. Laue data suggest that K-OMS-2 helices consist of large domains of particles.

K-OMS-2 Helix theoretical (experimental via inductively coupled plasma and combustion analyses) K/Mn 0.2325 (0.2325). Trace levels of silicon were detected at the surface.

The XRD data clearly showed that microporous phases were present in these helices. K-OMS-2 phase showed a surface area of 13 $m^2/g$.

Conductivity Studies of Helical K-OMS-2

Figure 6:
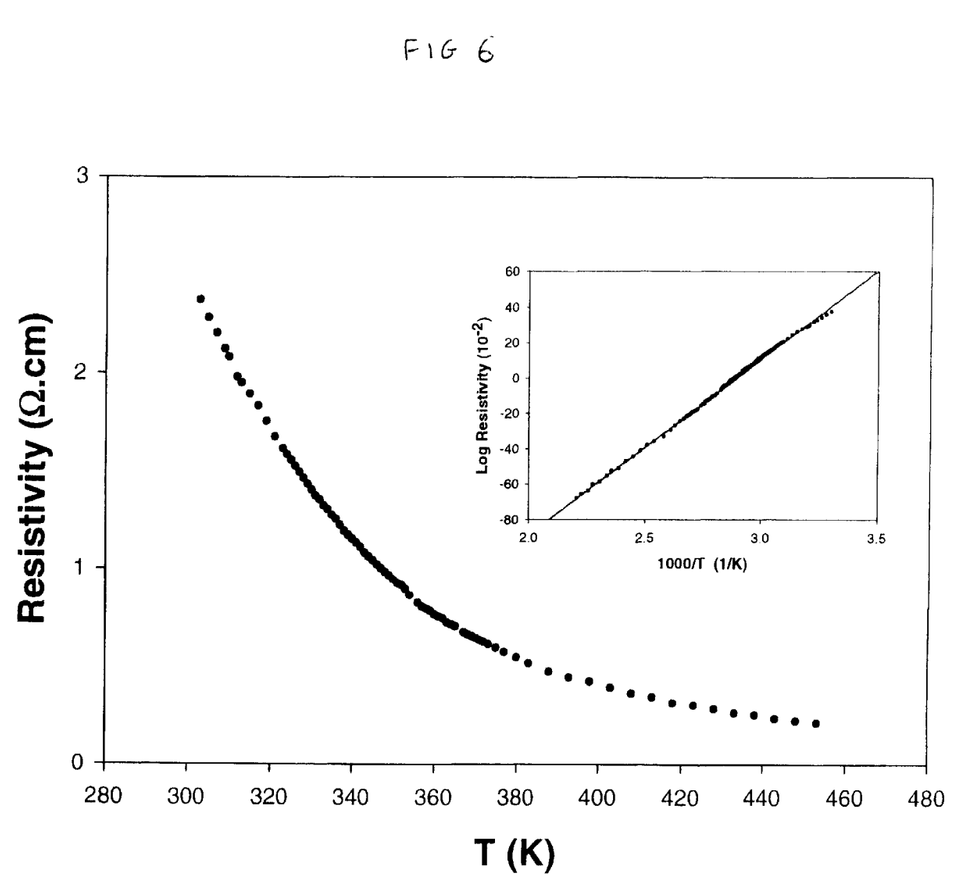
FIG. 6 is a plot of resistivity in Ohm-cm versus temperature (K) for the K-OMS-2 helix system; the inset shows a plot of log resistivity×10$^{-2}$ versus 1000/T (1/K) and is evidence of semiconducting material behavior.

A plot of resistivity versus temperature is given in FIG. 6 for the helical K-OMS-2 system. The inset of FIG. 6 shows the linear relationship between log resistivity versus 1/T predicted for semiconducting materials. A conductivity of $4.2 \times 10^{-1}$ $Ohm^{-1}$ $cm^{-1}$ at 21° C. was observed which is about one order of magnitude more conductive than most well formed single crystals of cryptomelane-like materials and about two orders of magnitude more conductive than highly dispersed powder materials previously reported for K-OMS-2 (see Strobel, P.; Vicat, J.; Qui, D. T., *J. Sol. State Chem.*, 1984, 55, 67–73; and DeGuzman, R. N.; Shen, Y. F.; Suib, S. L.; Shaw, B. R.; O'Young, C. L., *Chem. Mater.*, 1993, 5, 1395–1400). This conductivity is very similar to that of doped Si, which ranges from $10^{-3}$ to $10^2$ $Ohm^{-1}$ $cm^{-1}$. (Powders of Na-OL-1 and K-OMS-2 have conductivities of $1.9 \times 10^{-6}$ and $2.3 \times 10^{-3}$ $Ohm^{-1}$ $cm^{-1}$ respectively.) Single crystals of cryptomelane have conductivities of about $3.0 \times 10^{-2}$ $Ohm^{-1}$ $cm^{-1}$.

EXAMPLE 5

Figure 2:
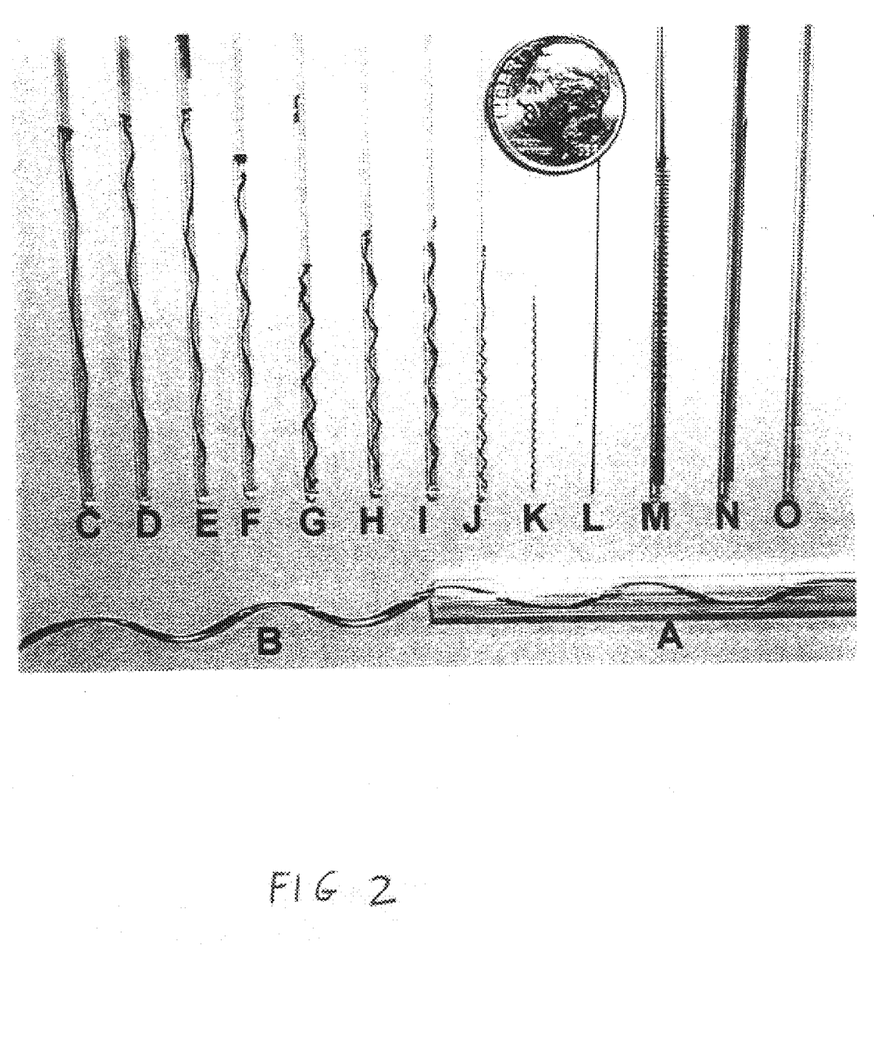
FIG. 2 displays macro- and micro-morphologies of self-assembled (TMA)$_y$MnO$_x$ colloids; final morphologies are observed after solvent evaporation at 85° C.
Figure 3:
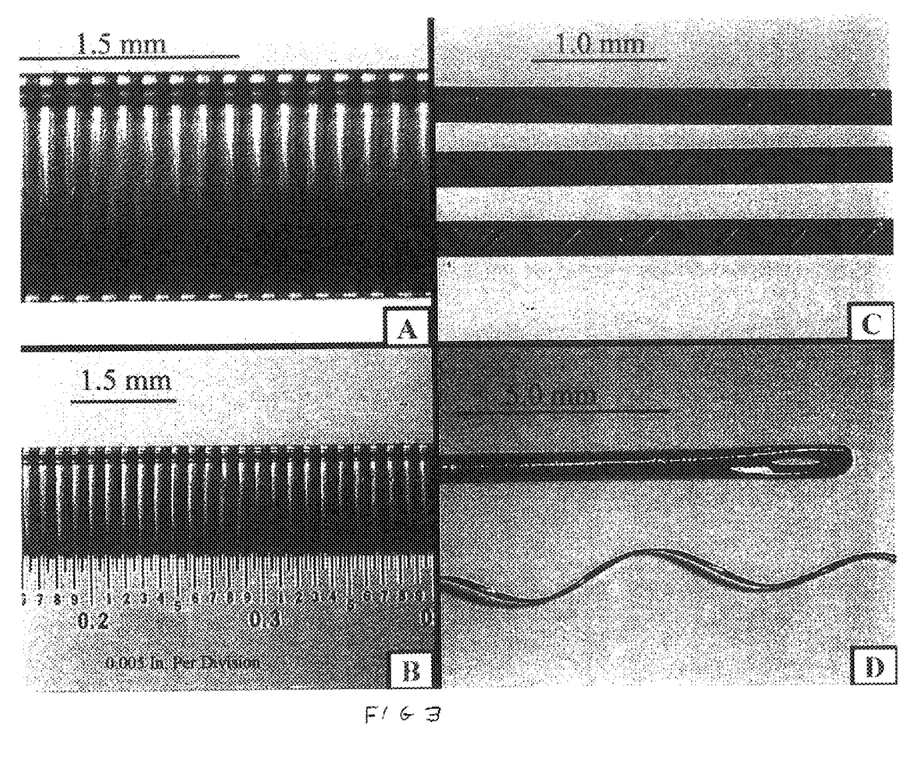
FIG. 3 displays optical microscope photographs (A) is from Sample O, FIG. 2, (B) shows micro-parallel rings from Sample N, FIG. 2, (C) shows examples of helices such as Sample L, FIG. 2, (D) is Sample H, FIG. 2 after ion exchange with K$^+$ (K-OL-1 helix).

A variety of samples were prepared to probe the effects of capillary diameter, elapsed time at 85° C., and manganese concentration. Conditions and observations are summarized in the table below, and the resulting products are shown in FIG. 2 and FIG. 3. At the conditions of N and O various structures can form, this being an intermediary region.

TABLE

| Sample | ID (mm) | Time (h) | [Mn] (M) | Observations |
|---|---|---|---|---|
| A | 3.0 | 140 | $1.0 \times 10^{-1}$ | Formation inside the glass tube |
| B | 3.0 | 140 | $1.0 \times 10^{-1}$ | Formation on the external surface of the glass tube |
| C | 1.2 | 24 | $1.0 \times 10^{-1}$ | Formation inside the glass tube |
| D | 1.2 | 24 | $9.0 \times 10^{-2}$ | — |
| E | 1.2 | 24 | $8.0 \times 10^{-2}$ | — |
| F | 1.2 | 24 | $7.0 \times 10^{-2}$ | — |
| G | 1.2 | 24 | $5.0 \times 10^{-2}$ | — |
| H | 1.2 | 48 | $5.0 \times 10^{-2}$ | — |
| I | 1.2 | 24 | $5.0 \times 10^{-2}$ | Helix post heated at 500° C. for 2 h |
| J | 0.8 | 24 | $1.0 \times 10^{-1}$ | Helix formed in a quartz tube |
| K | 0.5 | 24 | $1.0 \times 10^{-1}$ | Helix formed in a glass tube |
| L | 0.2 | 24 | $1.0 \times 10^{-1}$ | Helix formed in a GC capillary tube |
| M | 1.2 | 24 | $5.0 \times 10^{-3}$ | Ring formation |
| N | 1.2 | 24 | $1.0 \times 10^{-3}$ | Mixture of rings and helices formed |
| O | 1.2 | 24 | $1.0 \times 10^{-3}$ | Only micro rings formed |

All of the references cited herein are incorporated by reference hereby. While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for forming mixed-valence manganese oxide materials, comprising:

preparing a solution comprising (a) a mixed-valence manganese oxide anion having an average manganese oxidation state of about 3 to about 4, (b) a quaternary ammonium cation, and (c) a solvent;

contacting the solution with a surface comprising hydroxyl groups; and evaporating the solvent to form a first mixed-valence manganese oxide material comprising the quaternary ammonium ion.

2. The method of claim 1, wherein the average manganese oxidation state is about 3.4 to about 3.6.

3. The method of claim 1, wherein the quaternary ammonium cation is represented by the formula $NR_4^+$, wherein each R is independently a $C_1$–$C_6$ alkyl group.

4. The method of claim 1, wherein the quaternary ammonium cation is tetramethylammonium or tetraethylammonium.

5. The method of claim 1, wherein the solvent comprises water.

6. The method of claim 1, wherein the solvent comprises water and an alcohol selected from the group consisting of methanol, ethanol, n-propanol, isopropanol, n-butanol, 2-butanol, n-pentanol, 2-pentanol, and 3-pentanol.

7. The method of claim 1, wherein the solvent comprises water and 2-butanol.

8. The method of claim 7, wherein the evaporation of solvent is conducted at a temperature of about 10° C. to about 200° C.

9. The method of claim 7, wherein the evaporation of solvent is conducted at a temperature of about 20° C. to about 90° C.

10. The method of claim 1, wherein the solution comprises the mixed-valence manganese oxide anion at a concentration of about $10^{-3}$ to about $10^{-1}$ moles/liter as atomic manganese.

11. The method of claim 1, wherein the surface comprising hydroxyl groups comprises a silicate glass.

12. The method of claim 1, wherein the surface is planar.

13. The method of claim 1, wherein the surface defines a cylinder.

14. The method of claim 1, wherein the first mixed-valence manganese oxide material self-assembles into the form of a ring, a helix, or a strand.

15. Them method of claim 14, wherein the self-assembly does not require a concentration gradient.

16. The method of claim 1, wherein the first mixed-valence manganese oxide material has an average manganese oxidation state of about 3 to about 4.

17. The method of claim 1, wherein the first mixed-valence manganese oxide material has an average manganese oxidation state of about 3.4 to about 3.6.

18. The method of claim 1, wherein the first mixed-valence manganese oxide material comprises a synthetic bimessite having the empirical formula (quaternary ammonium)$_4$Mn$_{14}$O$_{27}$·nH$_2$O where n is about 5 to about 50.

19. The method of claim 1, further comprising contacting the first mixed-valence manganese oxide material with a solution comprising a metal cation selected from groups I, II, III, IV, V, VI, VII, and VIII of the periodic table to form a second mixed-valence manganese oxide material comprising the metal cation.

20. The method of claim 19, wherein the metal cation is selected from $Li^+$, $Na^+$, $K^+$, $Rb^+$, $Cs^+$, $Mg^{2+}$, $Ca^{2+}$, $Sr^{2+}$, and $Ba^{2+}$.

21. The method of claim 19, wherein the second mixed-valence manganese oxide material comprising the metal cation comprises a synthetic bimessite having the empirical formula $(M^{q+})_{4/q}Mn_{14}O_{27} \cdot nH_2O$ where n is about 5 to about 50, and $M^{q+}$ is selected from $Li^+$, $Na^+$, $K^+$, $Rb^+$, $Cs^+$, $Mg^{2+}$, $Ca^{2+}$, $Sr^{2+}$, and $Ba^{2+}$.

22. The method of claim 19, further comprising heating the second manganese oxide material comprising the metal cation to a temperature not less than about 500° C. to produce a third mixed-valence manganese oxide material comprising the metal cation.

23. The method of claim 22, wherein the third mixed-valence manganese oxide material comprising the metal cation has an average manganese oxidation state of about 3.5 to about 3.7.

24. The method of claim 22, wherein the third mixed-valence manganese oxide material comprising the metal cation comprises a cryptomelane material having an empirical formula of $K_{1.85}Mn^{4+}_{4.7}Mn^{3+}_{3.3}O_{14.57} \cdot nH_2O$ where n is not greater than about 1.0.

25. A method forming mixed-valence manganese oxide materials, comprising;
preparing a colloidal solution comprising a quaternary ammonium manganese oxide and a solvent;
contacting the colloidal solution with a surface comprising hydroxyl groups; and
evaporating the solvent to form a mixed-valence manganese oxide material.

26. The method of claim 25, wherein the colloidal solution comprises quaternary ammonium manganese oxide as amorphous particles of about 40 to about 60 Angstroms.

27. The method of claim 25, wherein the average manganese oxidation state is about 3.4 to about 3.6.

28. The method of claim 25, wherein the quaternary ammonium manganese oxide comprises a quaternary ammonium cation is represented by the formula $NR_4^+$, wherein each R is independently a $C_1$–$C_6$ alkyl group.

29. The method of claim 25, wherein the quaternary ammonium manganese oxide comprises tetramethylammonium ion.

30. The mnethod of claim 25, wherein the preparing a colloidal solution comprises contacting an aqueous solution of a quaternary ammonium salt of a manganese oxide anion having mmanganese in the +5, +6, or +7 oxidation state with an alcohol selected from the group consisting of methanol, ethanol, n-propanol, isopropanol, n-butanol, 2-butanol, n-pentanol, 2-pentanol, and 3-pentanol.

* * * * *

UNITED STATES PATENT AND TRADEMARK OFFICE
CERTIFICATE OF CORRECTION

PATENT NO. : 6,503,476 B1
APPLICATION NO. : 09/624423
DATED : January 7, 2003
INVENTOR(S) : Steven L. Suib et al.

It is certified that error appears in the above-identified patent and that said Letters Patent is hereby corrected as shown below:

Column 2:
Line 17, before "widths", delete "mnm" and insert therefor --nm--;
Line 35, after "so-called", delete "Liesegan g" and insert therefor --Liesegang--;
Line 53, before "cation", delete "arnmonium" and insert therefor --ammonium--;

Column 3:
Line 44, after "a", delete "quateruary" and insert therefor --quaternary--;

Column 6:
Line 29, after "time-lapse", delete "hotographs" and insert therefor --photographs--;

Column 7:
Line 12, after "Tetramethylammonium", delete "permnanganate" and insert therefor --permanganate--;
Line 27, after "(OH)", delete "$_{1.3}$" and insert therefor --$_{1.03}$--;
Line 36, after "2.7 H$_2$O", insert --and a synthetic--;
Line 53, delete "Materials and Methods" and insert therefor --MATERIALS AND METHODS--;
Line 55, after "from", delete "tetramethylammoniun" and insert therefor --tetramethylammonium--;

Column 8:
Line 31, after "a", delete "tetram ethyl ammonium" and insert therefor --tetramethylammonium--;
Line 39, before ",", delete "TMAyMnOx Helix" and insert therefor -- TMAyMnOx Helix--;
Line 54, after "and", insert --the--;
Line 55, after "synthetic", delete "bimessite" and insert therefor --birnessite--;
Line 57, after "the", delete "bimessite" and insert therefor --birnessite--;

Column 9:
Line 44, after "helix", delete "fragrnent" and insert therefor --fragment--;

Column 10:
Line 1, after "K-OMS-2", insert --:--;

Column 11:
Line 43, before "having", delete "bimessite" and insert therefor --birnessite--;

UNITED STATES PATENT AND TRADEMARK OFFICE
CERTIFICATE OF CORRECTION

PATENT NO. : 6,503,476 B1
APPLICATION NO. : 09/624423
DATED : January 7, 2003
INVENTOR(S) : Steven L. Suib et al.

It is certified that error appears in the above-identified patent and that said Letters Patent is hereby corrected as shown below:

<u>Column 12:</u>
Line 6, after "synthetic", delete "bimessite" and insert therefor --birnessite--;
Line 42, after "the", delete "mnethod" and insert therefor --method--.

Signed and Sealed this

Twenty-fourth Day of July, 2007

JON W. DUDAS
*Director of the United States Patent and Trademark Office*